United States Patent [19]
Sorrells et al.

[11] 3,878,279

[45] Apr. 15, 1975

[54] SYSTEM FOR THE MANUFACTURE OF FOAMED REPRODUCTIONS OF ARTICLES

[76] Inventors: Frank D. Sorrells, 5516 Timbercrest Tr., Knoxville, Tenn. 37919; Charles A. Lee, 1216 Snowdon Dr., Knoxville, Tenn. 37918

[22] Filed: Jan. 11, 1973

[21] Appl. No.: 322,858

[52] U.S. Cl.............. 264/54; 260/2.5 BD; 264/51; 264/53; 264/101; 264/130
[51] Int. Cl............................................. B29c 5/00
[58] Field of Search......... 264/51, 53, 54, 101, 130; 260/2.5 BD

[56] References Cited
UNITED STATES PATENTS

| | | | |
|---|---|---|---|
| 2,434,780 | 1/1948 | Wiss et al. | 264/101 |
| 3,015,851 | 1/1962 | Wiles | 264/53 |
| 3,086,248 | 4/1963 | Culp | 264/53 |
| 3,239,880 | 3/1966 | Oxel | 264/51 |
| 3,264,381 | 8/1966 | Stevens | 264/53 |
| 3,317,641 | 5/1967 | Heier | 264/101 |
| 3,378,612 | 4/1968 | Dietz | 260/2.5 |
| 3,501,559 | 3/1970 | Chess et al. | 260/2.5 |

FOREIGN PATENTS OR APPLICATIONS

| | | | |
|---|---|---|---|
| 1,000,566 | 8/1965 | United Kingdom | 260/2.5 |
| 839,188 | 6/1960 | United Kingdom | 260/2.5 |

Primary Examiner—Donald E. Czaja
Assistant Examiner—Eugene C. Rzucidlo
Attorney, Agent, or Firm—Fitch, Even, Tabin & Luedeka

[57] ABSTRACT

A method for the manufacture of molded cellular articles, particularly polyurethane, including the steps of forming a female mold, disposing the mold in a receptacle in a manner that provides for air flow about and out of the mold, admitting foam-generating agents to the mold cavity, positioning a cover on the receptacle, developing a pressure within the receptacle that is lower than ambient atmospheric pressure whereby the cover for the receptacle is moved into closing engagement with the mold, and withdrawing gaseous material from the mold for at least that time during which said foam-generating agents react and expand to fill the mold cavity. Apparatus for carrying out the method includes a receptacle having preselected resiliency in its walls to provide for controlled movement of the cover into engagement with the mold and includes a cover that provides for continued withdrawal of gases from the mold cavity during foaming activity while restricting escape of the foam from the mold.

5 Claims, 8 Drawing Figures 3,878,279

SYSTEM FOR THE MANUFACTURE OF FOAMED REPRODUCTIONS OF ARTICLES

This invention relates to plastic molding systems, particularly to systems for the manufacture of molded cellular articles.

The present invention deals with the manufacture of cellular, i.e., foamed plastic (particularly polyurethane), articles by molding. Foamed plastic articles have been made heretofore using molding techniques. A common method, when molding polyurethane foam, involves the use of RTV silicone rubber molds, a foam mixing and dispensing machine and a press to contain the foam within the mold as the foam components react. While very simple means can be used for the containment of the rising foam; i.e., toggle clamps or a simple air cylinder direct acting press, equipment to provide an automated production line such as a powered double roller press can cost $20,000 to $60,000. Such capital outlay for equipment for quantity production can price a molded product out of the competition in the market place.

It is an object of the present invention to provide a system for molding articles wherein the cost per unit of molded product is minimized. Other objects and advantages of the invention will be recognized from the following description including the Figures in which.

In accordance with the present disclosure there is provided a method for forming a foamed article including the steps of forming a female mold, disposing the mold in a receptacle in a manner that provides for air flow about and out of the mold, admitting foam-generating agents to the mold cavity, positioning a cover on the receptacle, developing a pressure within the receptacle that is lower than ambient atmospheric pressure whereby the cover for the receptacle is moved into closing engagement with the mold, and withdrawing gaseous material from the mold for at least that time during which said foam-generating agents react and expand to fill the mold cavity. The disclosed method also contemplates the step of interposing a film, coating or the like between the mold and the foaming agents for one or more purposes such as protection of the mold surface against wear and tear, development of a selected surface or surface finish on the molded product, and/or protection of the molded product against undesirable influences exerted by the mold.

Apparatus for carrying out the method includes a receptacle having preselected resiliency in its walls to provide for controlled movement of the cover into engagement with the mold and includes a cover that provides for continued withdrawal of gases from the mold cavity during foaming activity while restricting escape of the foam from the mold.

The disclosed method and apparatus are directed generally to the manufacture of foamed plastic articles wherein the pressure experienced by the apparatus is less than about 20 psi but it will be recognized that much greater pressures are readily accommodated as by the use of externally applied forces as will be referred to hereinafter.

Figure 3:
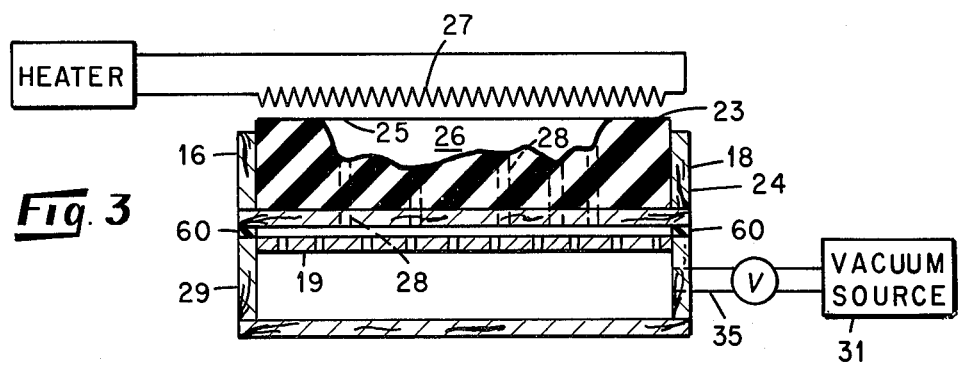
Figure 4:
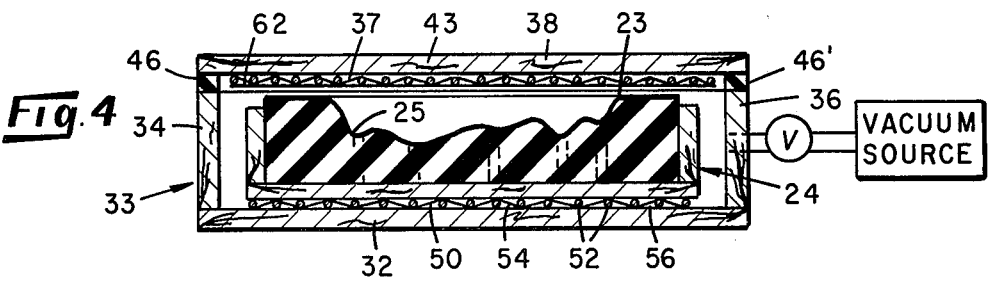
Figure 5:
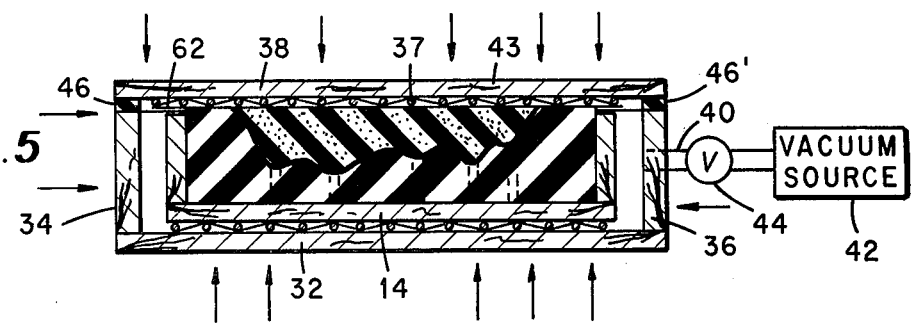
Figure 6:
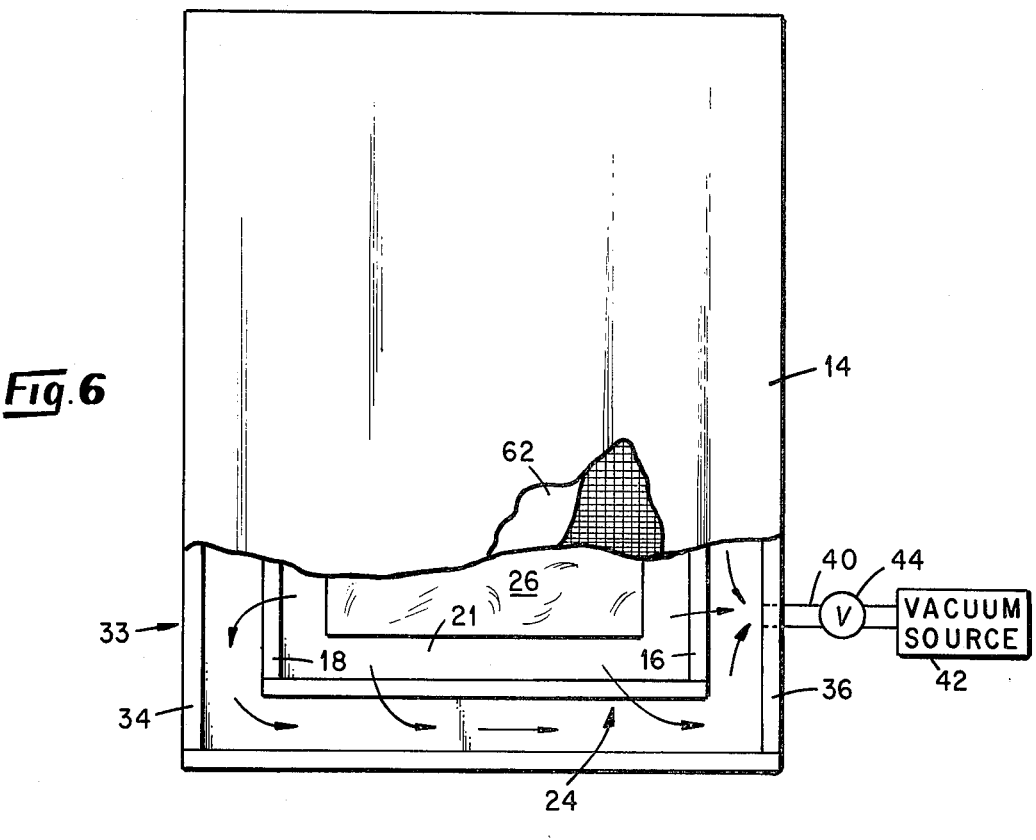
FIG. 6 is a representation, partly cut-away, of an apparatus depicting various features of the invention.

The method and apparatus disclosed herein are described in connection with polyurethane foam molding material but it is recognized that other foamed molding materials may be formed into products employing the disclosed concepts. With reference to the Figures, one embodiment of the disclosed method comprises the steps of disposing an article 10 to be reproduced (at times referred to as an "original" or "master") in a first frame 12 having a bottom 14 and end and side walls 16 and 18, respectively. Relatively thin strips 15 and 17 are disposed between the side walls 16 and 18 and the bottom 14 for purposes which will appear hereinafter. In plan view the first frame may be of any acceptable geometry but is considered to be rectangular for purposes of this disclosure. The inside dimensions of the frame 12 are chosen to provide open space 20 between the master and the side and end walls of this first frame. This open space 20 is filled with a material suitable to form a female mold. One such material is silicone rubber (RTV) 21 available from Dow Corning Corporation of Midland, Mich. The RTV is poured into the open space 20 around the master 10 to fill the space between the frame 12 and the master 10 and the RTV-filled frame is closed with a cover 22. After the RTV has solidified the subassembly is inverted (FIG. 3), the bottom 14 of the inverted frame 12 and the strips 15 and 17 are removed to expose the RTV. This exposes a circumferential rim 23 about the top of the RTV portion of the mold. The master is extracted from the RTV, leaving a female mold having a cavity 26 which is a replication of the master. The assembly defines the working mold 24 of the present method. Other materials such as plastic, e.g., epoxy, base casting materials with or without fillers such as metal powder also provide suitable molds. These and other materials (metals or ceramics, for example), when formed about a master or otherwise provided with a mold cavity can be substituted for the RTV to develop a working mold.

The RTV mold is capable of receiving polyurethane foam-generating agents. Certain foaming plastics particularly polyurethanes, bond at least to a limited degree with RTV so that when the product is removed from the mold, small pieces of the RTV are pulled out thereby degrading the mold and reducing its useful life. To avoid this contingency, the present inventors employ one of two possible techniques. First, the mold cavity may be sprayed with a parting agent which may take the form of a paint to be transferred to the polyurethane product as it is demolded. Through choice of the parting agent, the product can thus be provided with a primer paint coat or with a finished painted surface. Second, the mold cavity may be lined with a thermoplastic film 25 to isolate the polyurethane foam from the RTV. One particularly suitable film is an acrylic film of 3 mils thickness. In preparation for applying this film, the RTV in the supporting frame 12 is provided with a plurality of passageways 28 extending from the female cavity 26 of the mold through the thickness of the mold and the frame. Conventional drilling methods suitably serve in developing the passageways 28. The mold is positioned over a suction box 29 having a perforated top 19 so that the passageways 28 through the mold communicate between the mold cavity 26 and the suction box 29. Sealing means such as a rubber strip 60 may be positioned between the periphery of the bottom of the mold and the top of the suction box to ensure against air leakage therebetween. Prior to applying suction, the mold 24 is overlaid with the thin plastic film 25 and exposed to a heater 27 to soften the thermoplastic film. Thereupon a vacuum is applied through a valved conduit 35 from a vacuum source 31 through the passageways 28 in the mold 24 to pull the softened plastic film into the female mold cavity and fully cover the molding surface. When cooled, the film retains its position in the mold. Film thicknesses vary depending on depth of draw and type of film used. Also, the type of film used varies depending upon the desired properties in the product. For example, acrylic films bond well to the polyurethane and provide integral coatings therefor, whereas polyethylene films are strippable from the foamed product to expose the paintable polyurethane. When using other than RTV molds, it is at times desirable to interpose a film or coating between the foam and the mold to protect the foam and develop the desired surface finished thereon.

Figure 7:
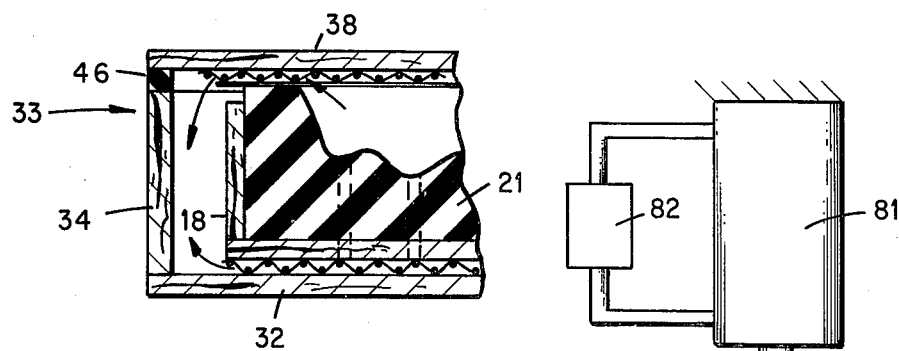
FIG. 7 is a fragmentary representation, in end view, of a portion of the apparatus shown in FIG. 6.

The working mold 24, with its painted or lined cavity, is disposed within a further frame including a bottom 32, a cover 38 and side and end walls 34 and 36, respectively, defining a receptacle 33, referred to hereinafter at times as a "suction box." This box 33 is wider and longer than the mold 24 so as to provide passageways about the sides and ends of the box 33 for the flow of air from the sides and ends of the mold (FIG. 7). As explained further hereinafter, the suction box 33 is chosen to be substantially larger than the mold so that the bottom 32 and cover 38 function as force multipliers through which a smaller force is multiplied and transmitted from outside the suction box 33 to the smaller mold 24 within the box 33, the forces resulting from the atmospheric pressure outside the box 33 being greater than the pressure within the box 33.

Foam generating agents, polyurethane foam generating agents, for example, are introduced into the lined female molding cavity 26 of the mold 24 in predetermined amounts and the box 33 is overlaid with the cover 38. A vacuum is developed within the box 33 by evacuating air from the box as by means of a conduit 40 leading from the interior of the box, through one of its sides 36, to a vacuum source 42. A valve 44 interposed in the conduit controls such vacuum. The positioning of this cover 38 over the box 33 is carried out sufficiently rapidly as permits it to be in place before the polyurethane foam generating agents have reacted and expanded sufficiently to cause the foam to overflow the mold. The time within which the mold 24 must be sealed to contain the expanding foam is brief, especially when molding articles having a relatively thin cross-section. By way of example, such time period may be less than 20 seconds where the cross section in question is about 1 inch. This time factor depends in part upon the pour rate of the equipment used to introduce the foam-generating agents into the mold, the size of the mold, and the cream time of the plastic foam. Larger thin molds generally provide less time for covering the mold. To this end, the inventors have found that it is particularly advantageous to utilize the cover 38 of the suction box 33 to close the mold 24 within the box. This is accomplished by providing resilient means associated with each of the side and end walls, 34 and 36 respectively, of the second frame for yieldably supporting the cover 38 of the suction box 33 to close the mold 24 within the box. This is accomplished by providing resilient means associated with each of the side and end walls, 34 and 36 respectively, of the second frame for yieldably supporting the cover 38 and by applying a vacuum in the interior of the box after the cover 38 is in position on the box 33 so as to cause the cover to bear against the end and side walls of the box, overcoming the yieldable support therefor, e.g. by compressing the wall height, and thereby move into closing engagement with the mold. It will be recognized that as a vacuum is developed within the suction box 33, a force acting against the exterior of the suction box is developed by atmospheric pressure. This force moves the cover down against the resilient means associated with the ends and sides of the frame to compress such resilient means in a vertical direction to the extent that the cover 38 is caused to overcome its yieldable support and to contact the upper rim 23 of the RTV and effectively close the mold against escape of foam therefrom. By this means, the cover 38 closes both the box 33 and the mold 24 disposed within the box. Thus, in the disclosed method, the functions of sealing the box and closing the mold are combined so that an operator has sufficient time to accomplish these functions after the polyurethane foaming agents are admitted to the mold and before the foam expands to overflow the mold. It will be recognized that the closing of the mold by the cover 38 contacting the rim 23 of the mold does not develop a fluid-tight seal between the mold and cover as discussed hereinafter.

Importantly, the inventors have found that products free of surface defects, imperfections, and the like are obtained consistently when the evacuation of gases from the mold cavity is maintained substantially throughout the period during which foaming takes place. This is accomplished by providing openings or channels leading out of the mold cavity to the interior of the box 33 which permit gases to pass therethrough but which do not permit the foam to pass. Such openings or channels may be provided by several means. A preferred means is to overlay an air-permeable release paper 62 or the like over the working mold 24 after introducing the foaming agents to the mold and withdrawing gases through the release paper. One suitable air-permeable release paper is Partwick Paper No. 3,000 from Paper Corp. of America. This paper has an air permeability of about 1.1 cubic feet per minute at 9 inches water pressure differential thereacross as measured using a Frazier Air Permeability Tester. In addition, it is preferred to provide a screen 37, preferably woven, between the inside surface of the suction box cover 38 and the release paper so that the interstices between weft and warp strands 39 and 41 of the screen define serpentine passageways for the flow of gas. When the cover 38, with the screen 37 and release paper 62 facing inwardly of the box 33, is placed on the box 33, and forced against the mold 24, the assemblage of release paper and screen forms a gas-permeable seal between the mold rim 23 and the cover 38. As a vacuum is developed within the box 33, first air and then the gaseous product from the foaming reaction are withdrawn from the mold cavity through the release paper, thence through the passageways defined by the screen, thence out of the box 33 via the conduit 40. Because the screen extends over the entire top of the mold 24, air is withdrawn from the mold at substantially all points over the top of the expanding foam.

With the gas removed from the mold cavity, the foam is free to expand uninhibitedly into and fully fill the mold cavity without the formation of surface defects or imperfections due to gas trapped in the mold by the expanding foam. This feature of the invention provides for consistent production of good products without using more costly techniques. As noted, in a preferred embodiment, the screen 37 extends over the entire area of the top of the mold so as to provide passageways from substantially all points at the top of the mold to the exterior of the mold. In this manner, gaseous reaction products from the foaming process are led from the mold cavity even though the foam expands nonuniformly and fills parts of the mold prior to completion of the foaming process. This feature prevents entrapment of gas, hence defects, in the more central parts of the top of the mold.

One means for providing the desired resiliency in the end and side walls 34 and 36, respectively, of the box 33 i.e. yieldable support for the cover 38, is to position a strip 46 of resilient material along the top edge of each side 34 and end 36 wall so that when the cover is placed over the box and forced against the walls by atmospheric pressure, the cover compresses the strips and moves against the upper rim of the mold 24. Sponge rubber of the closed cell type satisfactorily serves in this capacity. An O-ring type seal has also been found to provide the desired resiliency. In any event, the vertical movement of the cover downwardly by a distance of about 1/16 inch has been found sufficient to permit good evacuation of the mold cavity while still closing the mold prior to the foam expanding to the point of overflowing the mold when the mold cavity volume is about 1,920 cubic inches and the vacuum is being pulled by a conventional Nash Vacuum pump having a 27-inch water capacity. Other combinations of conditions may require more or less resiliency in the frame walls. It will be apparent that the timing for closing the mold is important in that too little vertical movement of the cover or movement that is too slow will allow loss of foam from the mold.

In the preferred apparatus, the mold 24 is supported in the suction box 33 on a further screen 50, preferably woven, having serpetine filaments 52 that from knuckles 54 which contact the bottom of the mold 24 and the bottom 32 of the suction box 33 to hold these two members apart. The interstices between the filaments define passageways along which air flows as the suction box is evacuated thereby withdrawing air from between the mold and the suction box. In the absence of such removal of air from between the mold and suction box, air can be trapped in such space so that the mold is subjected to unevenly distributed pressures that warp the mold and produce a defective product. Whereas screen-type members are preferred in this air removal function, it is recognized that other means may be employed to provide support for the mold and passageways for the air to escape. One such other means may be a porous plate. Such other means are usually more expensive than conventional woven screen material and are less desirable for this reason, among others.

In the preferred apparatus, the cover 38 of the suction box 33 is of a length and width greater than the corresponding dimensions of the mold 24. The area of a flat side of the cover is thus greater than the area of the mold that is covered by the cover 38. The atmospheric pressure acting against the exterior surface 43 of the cover 38 is transmitted through the cover 38 to the mold rim 23 so that a relatively small force applied against the cover by atmospheric pressure will successfully resist movement of the cover by a larger force within the mold cavity acting to dislodge the cover. Thus, for example, it is possible to utilize a relatively small pressure differential across the cover 38 to develop a force sufficient to resist a force of as much as about 20 psi acting within the mold to dislodge the cover. Inasmuch as the resultant force developed by atmospheric pressure against the cover is a function of the reduced pressure within the suction box, and because the atmospheric pressure-force is concentrated with respect to the mold, a relatively poor vacuum within the suction box results in sufficient force against the cover for maintaining the mold closed. A relatively low capacity, low cost, vacuum pump thus is suitable as the vacuum source for withdrawing gas from within the suction box 33 and the mold cavity 26.

Figure 8:
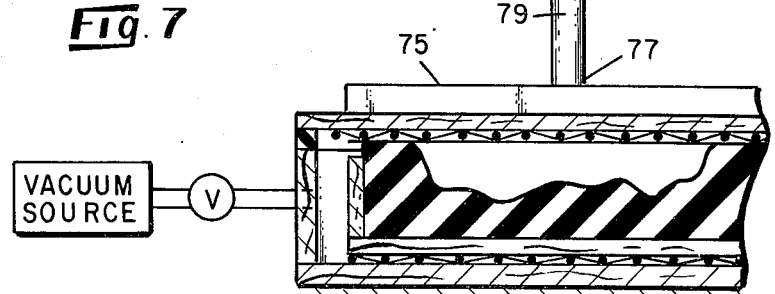
FIG. 8 is a representation of apparatus for applying a supplementary closing force to the disclosed mold.

As best seen in FIG. 8, in the event it is desired to produce products which, usually by reason of the quantity of foam-generating agents admitted to the mold, cause the pressure within the mold to rise to the point that the cover 38 of the box 33 can not be held in place by the aforesaid pressure differential between the interior and exterior of the box 33, additional pressure to maintain the cover in place can be applied. In the embodiment depicted in FIG. 8, the cover 38 of the box 33 is contacted by a platen 75 mounted on the end 77 of a ram 79 which is reciprocatably held within a hydraulic cylinder 81. Conventional means, identified in the Figure as a hydraulic pressure source 82, is provided to selectively move the ram 79, hence the platen 75, into and out of contact with the cover 38 to supply selected additional pressure against the cover to maintain it in its closed position over the box 33 and the mold 24. Other means for supplying supplemental closing pressure to the cover 38 will be apparent to one skilled in the art.

Figure 1:
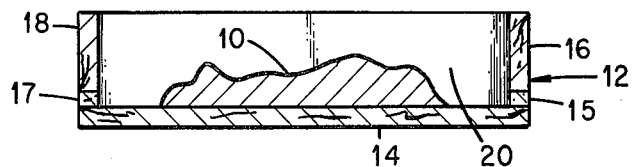
FIGS. 1–5 are representations of one embodiment of an apparatus embodying various features of the invention and depicting various steps of the method.
Figure 2:
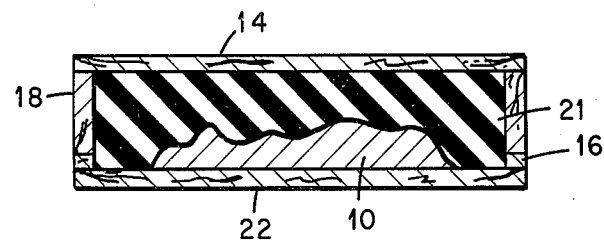

The described method and apparatus were employed in the manufacture of a polyurethane foam reproduction of an oak wood window shutter. In this example, the oak wood shutter was treated with a conventional lacquer thinner, namely, Seabo No. 1,210 from Seaboard Lacquer, Inc., Baltimore, Maryland, to soften the wood pulp and thereafter brushed with a wire brush to emphasize the wood grain. A release agent was applied to the shutter and it was placed in a frame as depicted in FIG. 1. SS-4171 silicon release agent from General Electric Company was used in this example. Other release agents are suitable and the choice is in large part dependent upon the materials involved.

The frame around the mold was filled with a silicone rubber known as Silastic RTV type E from Dow Corning Corporation, Midland, Mich. After the RTV had solidified, the shutter was removed. Holes were drilled through the mold and the frame, being careful to locate holes at the deepest points of the mold cavity. This mold, in its frame, became the working mold.

This mold was placed on a box adapted to apply a vacuum through the holes drilled in the mold to the mold cavity. A 3-mil thick film of precolored Korad A acrylic film from Rohm & Haas Company was disposed over the mold cavity and softened by heating it to about 325°F. A vacuum was developed within the mold cavity via the box 33, causing the softened film to enter the mold cavity and conform to the cavity contour. The acrylic film of this example provides the desired protection of the RTV mold from degradation by polyurethane foam and adheres to the foamed product to provide it with a skin that is resistant to deterioration by the natural elements and which can be painted as desired. Other films provide other properties in the product.

The lined mold was placed in a second and larger frame defining a suction box having end and side walls that were about 1/16 inch higher than the peripheral rim of the RTV. A sponge rubber (closed cell type) strip was adhered to the top edge of each of the walls of the suction box to provide for the desired seal between these members and the cover for the suction box and provide the desired resiliency in the frame walls.

The shutter in this example was 39 inches long and 15 inches wide. At its thickest point, it was 1 ⅛ inches thick. The volume of the mold cavity was approximately 475 cubic inches. Approximately 2.2 pounds of polyurethane foam agents were admitted to the mold, the agents being mixed simultaneously with their introduction to the mold. The agents used in this example were WUC-21350-R a polyether polyol hydroxyl resin and WUC-3042-T a polymeric polyisocyanate as sold by BASF Wyandotte Corporation, Wyandotte, Michigan. This particular foam has a free rise of about 7 pounds per cubic foot.

A sheet of air permeable release paper (Partwick Paper No. 3,000 from Paper Corp. of America) and the suction box cover having a screen on its inner surface were quickly placed over the suction box after the foam generating agents were admitted. Evacuation of the box was immediately commenced. In this example, the foam expand sufficiently fast so that it substantially filled the mold in about 90–100 seconds from start of pour. The apparatus used in making these shutters provided for substantially complete evacuation of the air from the mold cavity and closing of the mold in less than this period of time. This was achieved by regulating the vertical movement of the suction box cover to that time and distance which brought the cover into closing engagement with the mold in the time allowed. Under the prevailing conditions of suction box volume, resiliency of the rubber sealing strips, and rate of air withdrawal, it was determined that about 1/16 inch vertical movement of the cover accomplished the desired results.

Evacuation of the suction box, hence withdrawal of gas from the mold cavity through the air-pervious release paper and the interstices between the strands of the screen on the inner surface of the cover, was continued during substantially the entire period of foaming of the reagents.

After a period of cooling and curing of the polyurethane foam, the product was demolded. A time period of about 4 to 6 minutes was found to be sufficient in the present example.

The shutter product incorporated the acrylic film as an integral part thereof. Its skin density was about 10.9 pounds and its internal density was about 7.0 pounds. The shutter exhibited a surface remarkably resembling an oak wood. It was flat, i.e., not warped, and of sufficient strength to resist destruction by the usual natural elements (for example, hail) and blows of objects thrown against it, such as balls as might be thrown against it, such as balls as might be thrown by children. These shutters, being made using a pre-colored acrylic film, did not require painting and their color remained fast when exposed to neutral elements.

When unprotected by the acrylic film, the RTV mold is degraded by the polyurethane foam so that it can be used only for a relatively few (from 250 to about 400) cycles. The plastic film lining used by the inventors has been found to provide a greatly extended life for the RTV mold. After many hundred cycles, the RTV mold used by the inventors shows no signs of degradation and appears to be good for many thousand cycles.

In molding articles employing the present method and apparatus, there is maximum utilization of the plastic in that only those amounts of foam-generating agents need be introduced into the mold which, when reacted, will produce a volume of foam approximately equal to the volume of the mold cavity. Contrary to prior art concepts of using "extra" foam to ensure that the foam spreads into and fills all parts of the mold cavity, the present method and apparatus provides for uninhibited "free" rise of the foam so that "extra" foam is not needed to ensure filling of the mold cavity. The present method thus requires less raw material and permits a lower manufacturing cost. In one specific instance, using the disclosed concepts, 1.75 pounds of foam were used to make a preselected size window shutter. This amount of foam completely filled the mold cavity and yielded an acceptable part. Using the same amount of foam but placing the filled mold in a standard press to hold the mold closed rather than the vacuum box resulted in the foam filling only approximately 80 percent of the mold cavity, thus a rejected product. To make the same product using a standard press, it was found that over 4.0 pounds of foam was required to completely fill the cavity or to render on acceptable product.

What is claimed is:

1. In a method for the manufacture of a molded cellular polyurethane article employing a female mold having a cavity that is representative of the shape of said article the improvement comprising the steps of, introducing foam-generating agents including a blowing agent and a foamable resin into said mold cavity, disposing said mold in a suction box, having an outlet therein and wall means adapted to yieldably support a cover for said suction box, positioning a cover over said suction box in gas-tight sealing engagement with said box wall means and spaced apart from said mold, applying suction to said suction box through said outlet to develop a pressure differential between the interior and exterior of said suction box whereby said mold cavity is substantially evacuated of any gas initially present therein and said cover over said suction box overcomes said yieldable support therefor and is moved into less than gas-tight closing relationship to said mold, and maintaining said applied suction for at least that period of time when said foam-generating agents are active whereby any gas generated during the generation of the foam and which escapes from said foam and into said mold cavity is withdrawn from said mold cavity.

2. The method of claim 1 and including the step of lining said mold cavity with a release agent prior to introducing said foam-generating agents into said cavity.

3. The method of claim 2 wherein said release agent is a thermoplastic film and including the steps of disposing said film over said mold cavity, heating said film to at least its softening temperature, and withdrawing air from between said cavity and said film to draw said film into said cavity.

4. The method of claim 1 and including the step of disposing between said suction box cover and said mold a member having passageways therethrough which are air permeable but which effectively block the flow of foam therethrough.

5. The method of claim 1 and including the step of applying a supplementary force against said movable cover from the exterior of said suction box to aid in maintaining said cover in position to close said suction box and said mold.

* * * * *